US 9,354,919 B2

(12) United States Patent
Chen et al.

(10) Patent No.: US 9,354,919 B2
(45) Date of Patent: May 31, 2016

(54) METHOD AND DEVICE FOR LOADING ANDROID VIRTUAL MACHINE APPLICATION

(71) Applicant: TENCENT TECHNOLOGY (SHENZHEN) COMPANY LIMITED, Shenzhen, Guangdong (CN)

(72) Inventors: Shuhua Chen, Shenzhen (CN); Yunfeng Dai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/478,030

(22) Filed: Sep. 5, 2014

(65) Prior Publication Data
US 2014/0380313 A1 Dec. 25, 2014

Related U.S. Application Data

(63) Continuation of application No. PCT/CN2013/088550, filed on Dec. 4, 2013.

(30) Foreign Application Priority Data

Jun. 4, 2013 (CN) .......................... 2013 1 0219141

(51) Int. Cl.
*G06F 3/00* (2006.01)
*G06F 9/00* (2006.01)
(Continued)

(52) U.S. Cl.
CPC .......... *G06F 9/45558* (2013.01); *G06F 9/4416* (2013.01); *G06F 9/4401* (2013.01); *G06F 2009/45562* (2013.01)

(58) Field of Classification Search
CPC .. G06F 9/54; G06F 2009/4557; G06F 9/4416
USPC ............................................... 719/310; 713/2
See application file for complete search history.

(56) References Cited

U.S. PATENT DOCUMENTS

| 2005/0081212 A1* | 4/2005 | Goud | .................. G06F 9/45558 718/107 |
| 2007/0074208 A1* | 3/2007 | Ling | .................. G06F 9/45558 718/1 |

(Continued)

FOREIGN PATENT DOCUMENTS

| CN | 101493781 A | 7/2009 |
| CN | 101689127 A | 3/2010 |

OTHER PUBLICATIONS

Frank Maker, A Survey on Android vs. Linux, 2009.*
(Continued)

*Primary Examiner* — Lechi Truong
(74) *Attorney, Agent, or Firm* — Staas & Halsey LLP

(57) ABSTRACT

A method and a device for loading a virtual machine application are provided herein. An exemplary method comprises: loading a management object of the virtual machine by the layer-booting object; reading the virtual machine configuration by the management object of the virtual machine; and invoking a creation function of the management object of the virtual machine by the virtual machine configuration and creating an operational instance of the virtual machine. The Android loading method and device for a virtual machine can be used to improve switching speed between instances.

16 Claims, 4 Drawing Sheets

(51) Int. Cl.
  *G06F 9/455*  (2006.01)
  *G06F 9/44*  (2006.01)

(56) References Cited

U.S. PATENT DOCUMENTS

2011/0238969 A1* 9/2011 Warkentin ............. G06F 9/441
　　　　　　　　　　　　　　　　　　　　　713/2
2012/0084481 A1 4/2012 Reeves et al.
2012/0124270 A1* 5/2012 Weissman ............. G06F 12/023
　　　　　　　　　　　　　　　　　　　　　711/6
2014/0053272 A1* 2/2014 Lukacs ................... G06F 21/53
　　　　　　　　　　　　　　　　　　　　　726/24

OTHER PUBLICATIONS

International Search Report issued Mar. 6, 2014 in corresponding International Patent Application No. PCT/CN2013/088550.
Chinese Office Action issued Oct. 23, 2015 in corresponding Chinese Patent Application No. 201310219141.8.

* cited by examiner

METHOD AND DEVICE FOR LOADING ANDROID VIRTUAL MACHINE APPLICATION

CROSS-REFERENCE TO RELATED APPLICATIONS

This application is a continuation application of International Application PCT/CN2013/088550, filed Dec. 4, 2013, and claims priority to Chinese Patent Application No. 201310219141.8, filed on Jun. 4, 2013, the entire contents of which are incorporated herein by reference.

FIELD OF THE INVENTION

The present disclosure generally relates to Internet technology and, more particularly, relates to a method and a device for loading an android virtual machine application.

BACKGROUND OF THE INVENTION

Currently, Android mobile devices have a lot of security problems, such as computer viruses or system vulnerabilities. On the other side, Android devices introduce more and more important applications, such as mobile payment, mobile security, etc. However, protection provided by the current security software is quite limited, users need an absolutely clean and safe environment to apply critical operations.

In order to provide such a clean and safe environment, a virtualization or multi-operating system is clearly a better solution.

However, by analysis, the inventors have found at least the following problem existing in the traditional technology: the Android virtual method in the prior art adopts operating system of multiple versions, and each operating system is loaded and run as a separate virtual machine. To switch between virtual machines, a way of restarting the current virtual machine and then selecting a target virtual machine is absolutely needed. That is, the current way for switching between virtual machines is a cold switching way, resulting in inefficiency for the virtual machines to switch from each other.

SUMMARY OF THE INVENTION

One aspect of the present disclosure includes a method for loading an android virtual machine application. The method can be implemented by a mobile terminal. In an exemplary method, the method comprises: loading a layer-booting object; loading a management object of the virtual machine by the layer-booting object; reading the virtual machine configuration by the management object of the virtual machine; invoking a creation function of the management object of the virtual machine by the virtual machine configuration and creating an operational instance of the virtual machine.

Another aspect of the present disclosure includes a device for loading an android virtual machine application. The device can include a mobile terminal. The mobile terminal includes a boot-object loading module configured to load the layer-booting object; a management object loading module configured to load the management object of the virtual machine by the layer-booting object; a configuration reading module configured to read the virtual machine configuration by the management object of the virtual machine; a virtual machine configuration initialization module configured to invoke the creation function of the management object of the virtual machine by the virtual machine configuration and creating an operational instance of the virtual machine.

Another aspect of the present disclosure includes a non-transitory computer readable storage medium storing one or more programs, the one or more programs comprising instructions, which, when executed by a mobile device having one or more processors and a display, cause the mobile device to perform operations including: loading a layer-booting object; loading a management object of the virtual machine by the layer-booting object; reading the virtual machine configuration by the management object of the virtual machine; invoking a creation function of the management object of the virtual machine by the virtual machine configuration and creating an operational instance of the virtual machine.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DESCRIPTION OF THE PREFERRED EMBODIMENTS

Reference will now be made in detail to exemplary embodiments of the disclosure, which are illustrated in the accompanying drawings.

Figure 1:
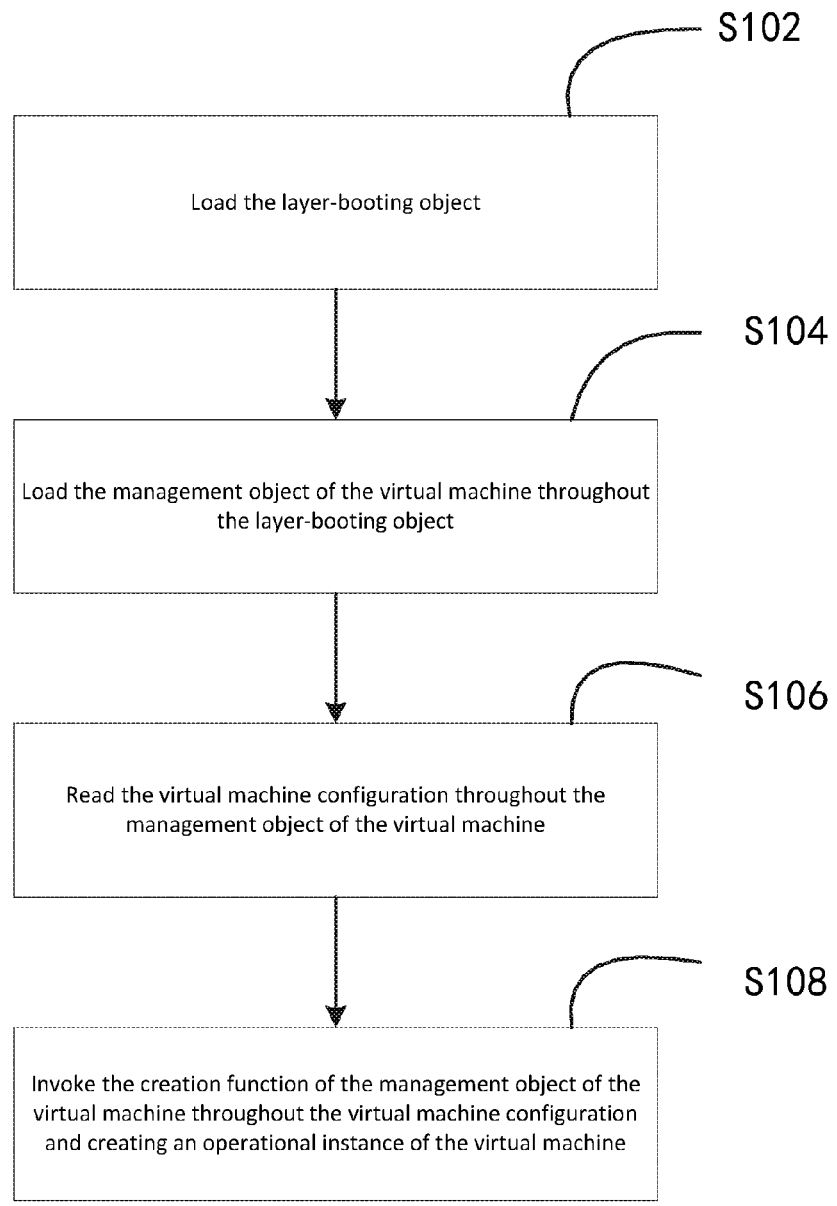
FIG. 1 is a flow chart of an exemplary method for loading the Android virtual machine, in accordance with one embodiment.

In one embodiment, as shown in FIG. 1, a method for loading an Android virtual machine is illustrated. The method is based entirely on computer program. The computer program can run on mobile devices based on the Android system, such as Android smart phones, Android tablet PC, Android smart glasses, etc.

Figure 2:
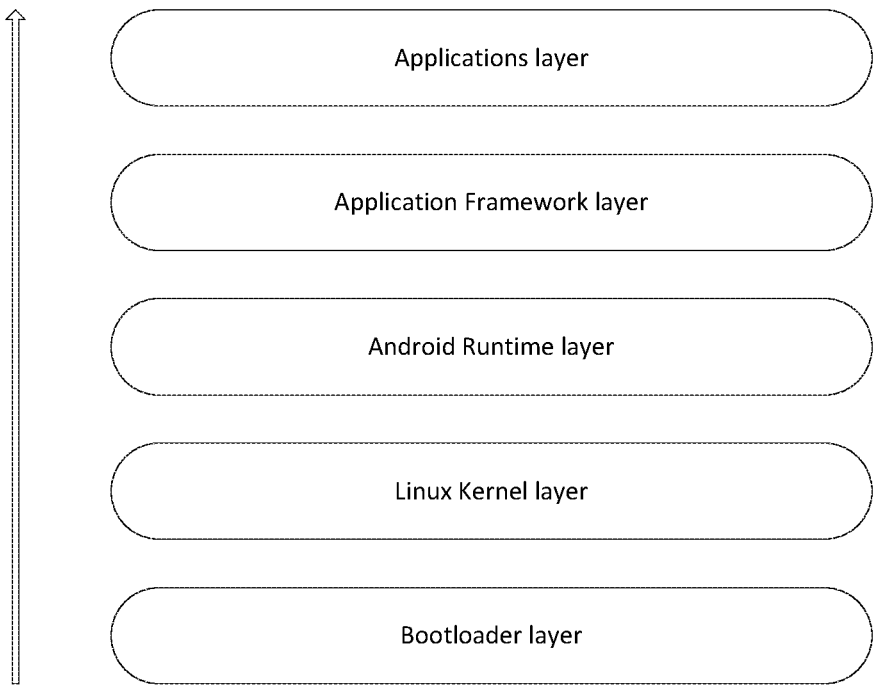
FIG. 2 is a block diagram of an Android system layer structure, in accordance with one embodiment.

As shown in FIG. 2, the Android system is a multilayer structure. From bottom to top, the Android system includes a Bootloader layer, a Linux Kernel layer, an Android Runtime layer, an Application Framework layer and an Application layer.

In this embodiment, the Bootloader layer serves as a guiding layer. It is used to initialize hardware equipment, and establish a memory mapping table. It is also used to lead a hardware and software environment of the Android system to a suitable state. So it can make a correct environment which is ready for the final calls to the operation system kernel.

The Linux Kernel is a Linux Kernel instance. The Linux Kernel instance is used to analyze a Linux layer kernel code into machine language. The Linux Kernel instance runs on the Android operating system. In addition, the Linux Kernel instance includes hardware drivers, such as a camera driver, a blue tooth adapter driver, a touch screen driver and a USB driver, etc.

The Android Runtime is used to explain the Android layer kernel which implements the Android code. In this embodiment, the Android Runtime includes an Android system function library, such as a WebKit library, a SSL library and a SQLite library.

The Application Framework layer is an application framework layer. It is used to control an upper application for loading, running and cancellation. And, The Application Framework layer provides various services for the upper application, such as a Location Manager component, a XMPP Service module and an activity manager module, etc.

The Application layer is an application layer. It is a specific application, such as a mobile phone browser, a micro message and a contact management, etc.

In this embodiment, the method includes the following steps:

Step S102, loading a layer-booting object.

A layer-booting object is a program unit used to load Android operating system kernel.

In this embodiment, a level boot object may be a Bootloader layer object, such as the Bootloader object used to load the Linux layer kernel, as described above. That is to say, virtualization can be realized in Linux Kernel layer, and several operational instances of virtual machines in Linux Kernel layer can be led to create by the Bootloader layer object.

In this embodiment, the Android equipment is based on an ARM processor. In an embedded system of the Android equipment, the BootLoader program generally occupies a memory address 0x00000000. When the Android device starts or reset, it begin to execute and load the layer boot-object from the memory address 0x00000000.

Step S104, loading a management object of the virtual machine by the layer-booting object.

The virtual machine management object is a program unit used to create, allocate and cancel the operational instance of the virtual machine. In this embodiment, the program unit corresponding to the virtual machine management object can be loaded by the Bootloader layer object.

Step S106, reading the virtual machine configuration by the management object of the virtual machine.

A configuration of the virtual machine is a configuration file of the operational instance in a virtual machine needed to be loaded. The configuration of the virtual machine may include the number of the virtual machine, identification of the virtual machine, a file list corresponding to the operational instance of the operational instance of the virtual machine, and a storage location corresponding to the operational instance of the operational instance of the virtual machine.

In this embodiment, the configuration of the virtual machine further includes a processor status register instruction set (PSR, Processor state Register) corresponding to the operational instance of the operational instance of the virtual machine. After the instruction set processor status register is read by the virtual machine management object, the PSR instruction set is encoded by invoking the instruction encoding function of the virtual machine management object.

In this example, each operational instance may have a special virtual machine running state of each processor. This is achieved by coding the PSR instruction set corresponding to the operational instance of the virtual machine. In this example, providing the processor with different operating conditions for each operational instance of the virtual machine is needed. But the instruction accessing the processor status register (CPSR) is fixed: such as MRS, MSR, ADDS etc.

For example, the PSR instruction set corresponding to the operational instance of the virtual machine can be replaced by the SWI xxx. The XXX is the recode of each instruction. For example, the MRS instructions can be encoded as 0x1000, and the MSR as 0x1001. But the XXX must be not consistent with the software interrupt number corresponding to the operational instance of the virtual machine. After encoding the PSR instruction Set in accordance with such method, the processor state could be virtual through the software interrupt instruction SWI. Then the operational instance of the virtual machine later created can be corresponded with the independent processor state of each other.

Step S108, invoking the virtual machine creation function of the virtual machine management object according to the virtual machine configuration, and creating the operational instance of the virtual machine.

In this embodiment, the virtual machine creation function of the virtual machine management object can load the operational instance of the virtual machine into the memory, according to the number of virtual machine defined by the virtual machine configuration and the instance program file list corresponding to the operational instance of the virtual machine.

Further, the PSR instruction set coded can be set as the PSR instruction set corresponding to the operational instance of the virtual machine.

In this embodiment, the method comprises: intercepting the interruption instructions and/or abnormal instructions by the management object of the virtual machine; accepting a memory location corresponding to the instructions and/or abnormal instructions; transmitting the instructions and/or abnormal instructions to corresponding instructions handling function and/or abnormal handling function of the operational instance of the virtual machine by the memory location.

Because of the interruption and exception table corresponding to each operational instance of the virtual machine have a fixed location in memory, the operational instance of the virtual machine which the interruption the instruction and/or abnormal instruction belong can be judged according to the memory address, and the respective interruption and/or abnormal of the operational instance of the virtual machine can be handled by their own respective interruption handling function and/or abnormal handling function.

Figure 3:
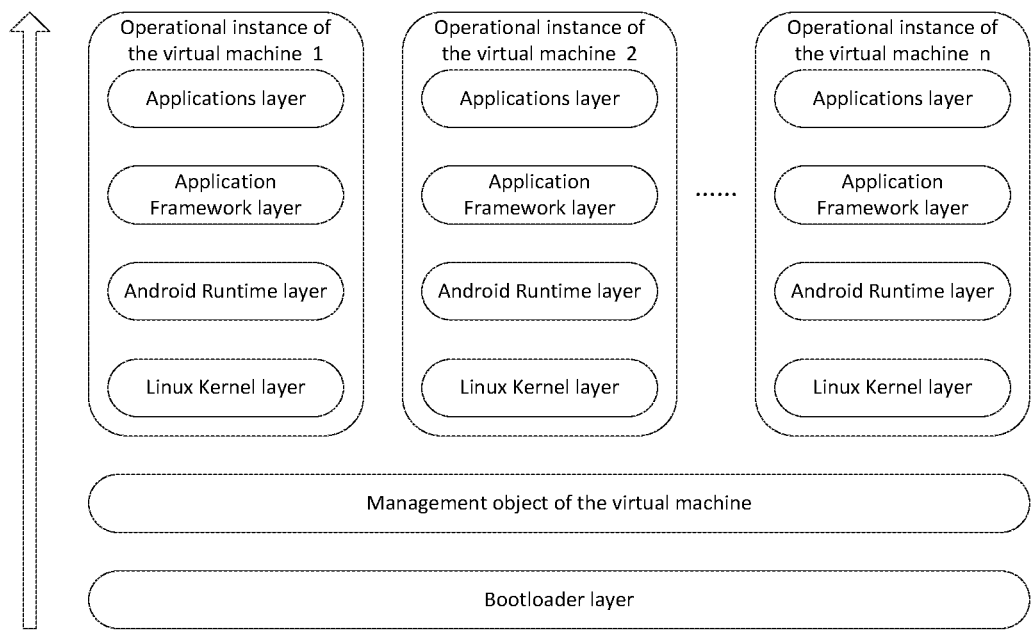
FIG. 3 is a block diagram of a virtual machine layer structure booted by a Bootloader layer, in accordance with one embodiment.

In this embodiment, the system architecture of the Bootloader layer-booting virtual machine based on object is shown in FIG. 3.

In another embodiment, the layer boot object is the Linux Kernel layer object. The Linux Kernel layer object is used to load the Android Runtime layer, which is the Android kernel. That is to say, the virtualization is realized in Android Runtime layer. The operational instances of the virtual machines of a several of Android Runtime layer are led to create by the Linux Kernel object boot. For example, firstly, the start of the zygote process can be removed from the system init.rc configuration. Then the start of the virtual machine management object is added, and the virtual machine management object is created from the Linux Kernel layer object boot.

In this embodiment, the step of invoking a creation function of the management object of the virtual machine by the virtual machine configuration and creating an operational instance of the virtual machine, comprises: invoking the creation function of the management object of the virtual machine by the virtual machine configuration and creating an zygote process; and creating an operational instance of the virtual machine based on Android Runtime layer by the zygote process.

Figure 4:
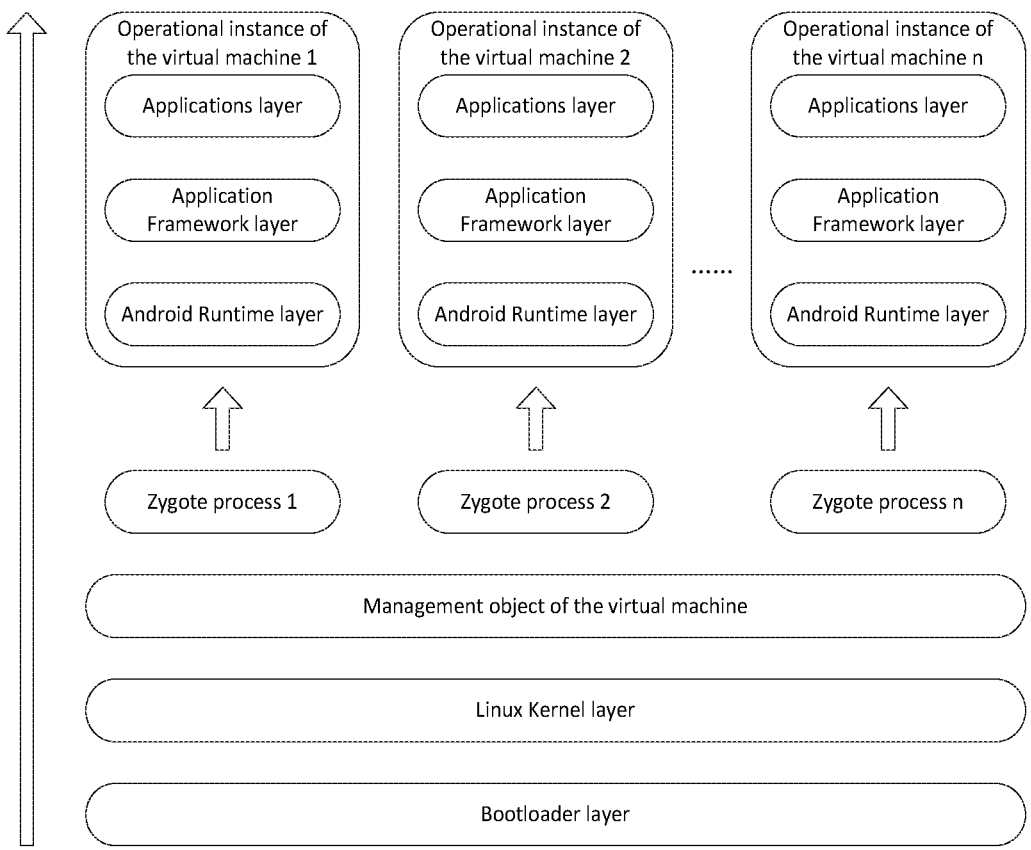
FIG. 4 is a block diagram of a virtual machine layer structure booted by the Linux kernel layer, in accordance with one embodiment.

That is to say, the virtual machine management object is loaded by the Linux Kernel layer object. Then, the virtual machine management object creates multiple zygote processes (also called seed process) according to the number of operational instance of the virtual machine and their virtual machine identification identified by the virtual machine configuration. Then, every seed process creates the corresponding operational instance of the virtual machine. In this embodiment, the virtual machine system architecture based on the Linux Kernel layer boot object is shown in FIG. 4.

The memory utilization rate increases, because several operational instances of the virtual machines share a same Linux Kernel layer loaded based on the Kernel layer Linux object boot mode. So, several operational instances of the virtual machines in memory only occupy a same area. That means a smaller memory footprint.

In this embodiment, the method further comprises: accepting a switching instructions of the virtual machine; and invoking a switching function of the management object of the virtual machine by the switching instructions of the virtual machine and switching the operational instance of the virtual machine.

In one scenario of this embodiment, the user inputs the virtual machine switching instruction, by clicking on the Android button on a device. Preferably, the virtual machine switching instruction may include virtual machine identification. The virtual machine identification is from the target switching operational instance of the virtual machine selected by the user. The virtual machine instructions, as a function of parameters, are passed to the virtual machine switching function of the virtual machine management object. The virtual machine switching function accesses to the area of memory corresponding operational instance of the virtual machine according to the virtual machine identification. The virtual machine switch function makes the operational virtual machine instance activation. In the display interface, users can quickly switch to the target operational instance of the virtual machine without restarting.

In this embodiment, the method further comprises: accepting a creation instructions of the virtual machine and invoking a creation function of the management object of the virtual machine by the creation instructions of the virtual machine and creating the operational instance of the virtual machine.

That is to say, when the Android device is turned on and used, the user can always create a new operational instance of the virtual machine. Preferably, in the virtual machine creation instructions, parameters for the creation of virtual machine inputted by users also is included, such as virtual machine identification parameter information. According to the parameters, the operational instance of the virtual machine can be created by the virtual machine creation function.

Figure 5:
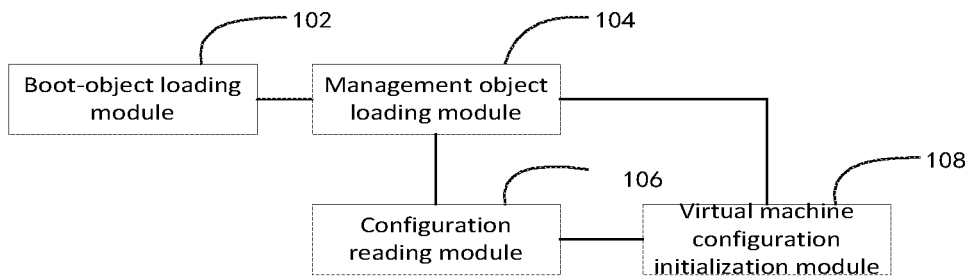
FIG. 5 is a block diagram of a device for loading an Android virtual machine, in accordance with one embodiment.

In this embodiment, as shown in FIG. 5, a device for loading a virtual machine application includes a boot-object loading module 102, a management object loading module 104, a configuration reading module 106, and a virtual machine configuration initialization module 108.

The boot-object loading module 102 is configured to Load the layer-booting object;

The management object loading module 104 is configured to load the management object of the virtual machine by the layer-booting object;

The configuration reading module 106 is configured to read the virtual machine configuration by the management object of the virtual machine;

The virtual machine configuration initialization module 108 is configured to invoke the creation function of the management object of the virtual machine by the virtual machine configuration and creating an operational instance of the virtual machine.

In one embodiment, the layer boot object is the Bootloader layer object.

The virtual machine configuration initialization module 108 is further configured to invoke the creation function of the management object of the virtual machine by the virtual machine configuration and create an operational instance of the virtual machine based on Linux Kernel layer.

In one embodiment, the virtual machine configuration further includes a processor status register instruction set corresponding to the operational instance of the virtual machine.

The configuration reading module is further configured to code the processor status register instruction set by invoking an instruction coding function of the management object of the virtual machine.

Figure 6:
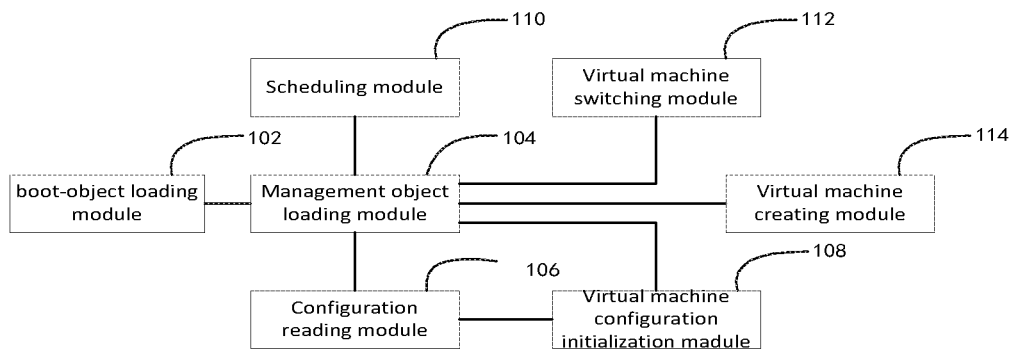
FIG. 6 is a block diagram of a device for loading the Android virtual machine, in accordance with another embodiment.

In one embodiment, as shown in FIG. 6, a device for loading a virtual machine application further includes an instructions scheduling module 110, which is configured to intercept the interruption instructions and/or abnormal instructions by the management object of the virtual machine, and is configured to accept a memory location corresponding to the instructions and/or abnormal instructions, and is configured to transmit the instructions and/or abnormal instructions to corresponding instructions handling function and/or abnormal handling function of the operational instance of the virtual machine by the memory location.

In one embodiment, the layer boot object is the Linux Kernel layer object.

The virtual machine configuration initialization module 108, is further configured to invoke the creation function of the management object of the virtual machine by the virtual machine configuration and creating a zygote process and to create an operational instance of the virtual machine based on Android Runtime layer by the zygote process.

In one embodiment, as shown in FIG. 6, a device for loading a virtual machine application further includes a virtual machine switching module 112. The virtual machine switching module 112 is configured to accept a switching instructions of the virtual machine and to invoke a switching function of the management object of the virtual machine by the switching instructions of the virtual machine and switching the operational instance of the virtual machine.

In one embodiment, as shown in FIG. 6, a device for loading a virtual machine application further includes a virtual machine creating module 114. The virtual machine creating module 114 is configured to accept a creation instruction of the virtual machine. In addition, the virtual machine creating module 114 is used to invoke a creation function of the management object of the virtual machine by the creation instructions of the virtual machine and creating the operational instance of the virtual machine.

The Android virtual machine loading method and the device of loading the virtual machine management object introduce the layer boot object boot. Then, several operational instances of the virtual machines are loaded by the virtual machine management object. When switching between operational instances of the virtual machine, the virtual machine management object switches between multiple operational instances of the virtual machine that it loads. This method does not need to restart the Android equipment and select the corresponding virtual machine to load when being led by the Bootloader boot. Therefore, switching between the operational instances of the virtual machine is a hot switching, thus switching speed is increased.

The methods and device in accordance with various embodiments can be accomplished by using a program/software to instruct related hardware. The hardware can include any suitable universal hardware, or any suitable specialized hardware including, e.g., specialized integrated circuits, specialized central processing unit (CPU), specialized memory, specialized components, etc. For example, the hardware can include personal computer, server, network device, etc. The program/software can be stored in a computer-readable storage medium including, e.g., ROM/RAM, magnetic disk, optical disk, etc. the computer-readable storage.

Figure 7:
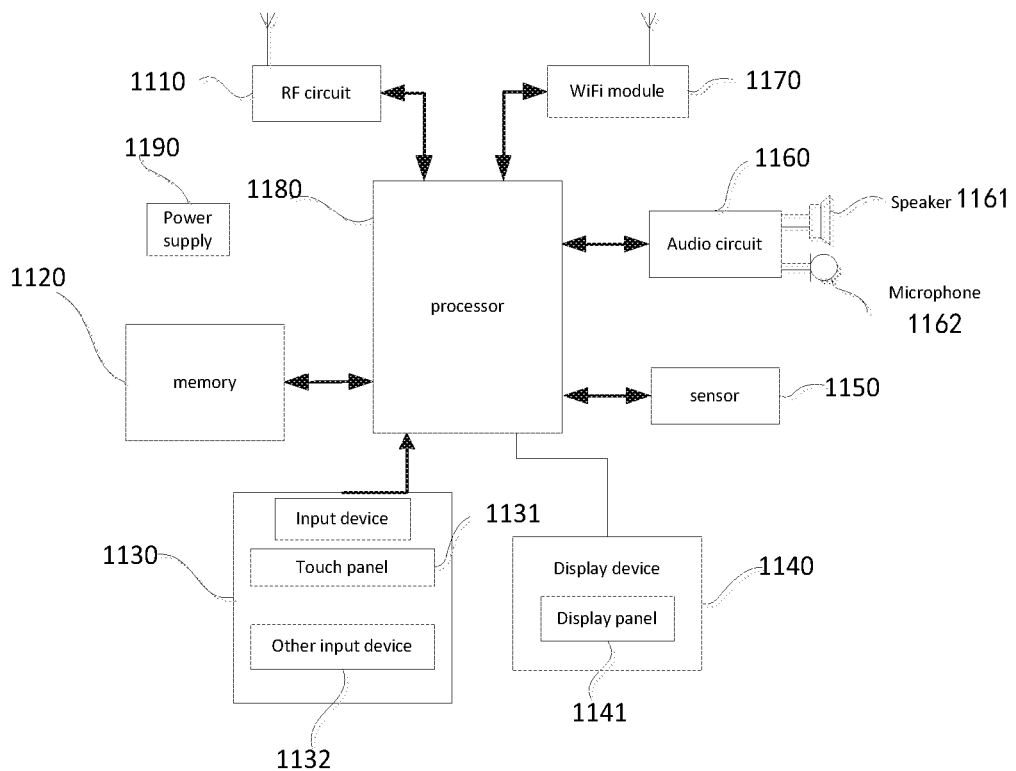
FIG. 7 is a block diagram of a device for loading the Android virtual machine, in accordance with still another embodiment.

The embodiment of the invention also provides an Android virtual machine loading device, as shown in FIG. 7. For illustration, only part of the components in relation to the embodiments of the invention is indicated. The technical details not revealed can be referred to the embodiments of the method in this invention. The Android virtual machine loading device can include a mobile phone, a tablet computer, a PDA (Personal Digital Assistant, personal digital assistant), a POS (Point of Sales, sales terminal), an a on-board computer and any terminal equipments. The following illustrates in detail, by using a mobile phone as an example.

FIG. 7 illustrates parts of the device (mobile phone) in this embodiment. The mobile phone includes a RF circuit 1110, a memory 1120, an input device 1130, a display device 1140, a sensor 1150, an audio circuit 1160, a wireless fidelity (WiFi) module 1170, a processor (CPU) 1180, and a power supply 1190, and other components, or the like, including a combination of two or more of these items.

Each of the components of the mobile phone will be introduced in details as follow.

The RF (radio frequency) circuit 1110 is used to receive and send electromagnetic waves during a call or message handing. In particular, the RF circuit 1110 receives downlink messages from a base station and passes them to the processor 1180 for further processing. In addition, the RF circuit 1110 sends uplink data to the base station. The RF circuit 1110 may include well-known circuitry for performing these functions, including but not limited to an antenna system, one or more amplifiers, an RF transceiver, a coupler, a Low Noise Amplifier (LNA), a duplexer, etc. The RF circuit 1110 may communicate with other electronic devices via networks, such as the internet or wireless. The wireless communication may use any of a plurality of communications standards, protocols and technologies, including but not limited to Global System for Mobile communications (GSM), General Packet Radio Service (GPRS), code division multiple access (CDMA), wideband code division multiple access (W-CDMA), Long Term Evolution (LTE), a protocol for email, instant messaging, and/or Short Message Services (SMS)), or any other suitable communication protocol, including communication protocols not yet developed as of the filling date of this document.

The memory 1120 is used to store software programs and applications. In this embodiment, the CPU 1180 run various software programs and/or sets of instructions stored in the memory 1120 to perform various functions for the mobile phone and to process data. The memory 1120 may include a program section and a data storage section for storing data, wherein the storage section can be used to store operating system program, at least one application (such as sound playback, image playback, etc.) for a certain required function. The data storage section can be used to store data created by the mobile phone during operation (such as audio data, phone book, etc.). In addition, the memory 1120 may include high speed random access memory and may also include non-volatile memory, such as one or more magnetic disk storage devices, flash memory devices, or other non-volatile solid state memory devices.

The input device 1130 can be used to receive input number or character information, and generate key signal input in relation to user settings and functional control of the mobile phone. In one example, the input device 1130 includes a touch panel 1131 and other input devices 1132. The touch panel 1131, which may be a touch screen, forms, for example, a touch-sensitive surface that accepts user input (for example, users use a finger, a stylus, and any other suitable object or attachment on or near the touch panel 1131). In addition, the touch panel 1131 drives a connecting device according to pre-set drivers. The touch screen 1131 may include a touch-sensitive device and a touch screen controller. In operation, the touch-sensitive device detects contact (and any movement or break of the contact) on its surface. In an exemplary embodiment, a point of contact between the touch screen 1131 and the user corresponds to one or more digits of the user. The touch-sensitive device detects the contact and sends a corresponding signal to the touch screen controller. The touch screen controller receives the signal and converts the detected contact into contact coordinates, and further sends the coordinates to the CPU 1180. Besides, the touch screen controller receives and executes instructions from the CPU 1180. In this embodiment, the touch screen 1131 may detect contact and any movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 1131. In addition, the input device 1130 may include other input devices 1132. For example, the other input devices 1132 include but not limited to one or any of the combination of a physical keyboard, function keys (such as volume control keys, switches keys, etc.), a trackball, a mouse, an operating lever.

The display device 1140 is used to displays virtual output to the user. The virtual output may include input information of the user, or information provided to the user, or different kinds of menu of the mobile phone. The display device 1140 may include, for example, a display panel 1141, and the display panel 1141 may, for example, use LCD (liquid crystal display) technology, or OLED (Organic Light-Emitting Diode) technology, although other display technologies may be used in other embodiments. In addition, the touch panel 1131 may cover the display panel 1141. When the touch panel 1131 detects contacts on or near its surface and sends a corresponding signal to the processor 1180 to determine the type of touch event, the processor 1180 controls the display panel 1141 to provide appropriate virtual output according to different types of contacts. Although the touch panel 1131 and the display panel 1141 may be separated from each other to implement input and output function of the mobile phone, however, the touch panel 1131 and the display panel 1141 may be integrated together to implement input and output functions of the mobile phone.

The mobile phone may further include at least one sensor 1150, such as a light sensor, a motion sensor and other sensors. Specifically, the optical sensor may include an ambient light sensor and a proximity sensor, wherein the ambient light sensor can be used to adjust brightness of the display panel 1141 according to the brightness of ambient light. The proximity sensor can be used to close the display panel 1141 and/or backlighting, when the mobile phone is operated near to the ear. The accelerometer sensor is one example of the motion sensor. In particular, the accelerometer sensor may detect acceleration of each direction (typically three axes). When the mobile phone is keep static, magnitude and direction of gravity can be detected by the accelerometer sensor. Thus the accelerometer sensor can be used to identify posture of the mobile phone (such as horizontal and vertical screen switch, related games, magnetometer calibration posture), vibration recognition related functions (e.g., pedometer, percussion), etc.; Furthermore, a gyroscope, a barometer, a hygrometer, a thermometer, or an infrared sensor, or other sensors can also be configured in the mobile phone, further details of such sensors will not be described here.

The audio circuit 1160, the speaker 1161, and the microphone 1162 provide an audio interface between a user and the mobile phone. The audio circuit 1160 receives audio data and converts the audio data to an electrical signal, and transmits the electrical signal to the speaker 1161. The speaker 1161 converts the electrical signal to human-audible sound waves. In addition, the audio circuit 1160 also receives electrical signals converted by the microphone 1162 from sound waves. The audio circuit 1160 converts the electrical signal to audio data and transmits the audio data to the CPU 1180 for processing. The audio data may be transmitted to another mobile phone via the RF circuit 1110, or transmitted to the memory 1120 for further processing.

WiFi is a short-range wireless technology. The mobile phone can help users to send and receive email, browse web service and access to streaming media etc. via a WiFi module 1170. In this embodiment, the WiFi module 1170 provides users with wireless broadband Internet accessing service. Although FIG. 7 shows a WiFi module 1170, it is noted that the WiFi module 1170 is only part of the mobile phone, that is, the WiFi module 1170 can be omitted in other embodiments without departing from the spirit of the present disclosure.

The processor 1180 may be, conceptually, a center of the mobile phone, and may be used, for example, to connect all parts of the mobile phone using a variety of interfaces and connections. In this embodiment, the processor 1180 runs various software programs and/or sets of instructions stored in the memory 1120 to perform various functions for the mobile phone and to process data. Generally, the processor 1180 may include one or more processing units or processors. Preferably, the processor 1180 may integrate an application processor and a modem processor, wherein the application processor is used mainly for processing operating system, user interface and applications, etc., and the modem processor is used mainly for wireless communications. It is noted, in other embodiments, the modem processor may not be integrated into the processor 1180.

The mobile phone may further include a power supply 1190 (such as battery) for providing power to various components. Preferably, the power supply 1190 can be logically connected to the processor 1180 via a power management system, and thus achieve management of charging, discharging, saving power, and other functions.

Although it is not shown in FIG. 7, the mobile phone may further include a camera, a Bluetooth module, etc., which are not further described here.

The devices described above according to various embodiments are merely illustrative. The units/modules depicted as separate components may be or may not be physically separated. Components shown as units may be or may not be physical units. That is, they may be located in one place or may be distributed to multiple network units. According to practical needs, part or all of the units/modules can be selected to achieve the purpose according to various embodiments.

The methods and device in accordance with various embodiments can be accomplished using a program/software to instruct related hardware. The hardware can include any suitable universal hardware, or any suitable specialized hardware including, e.g., specialized integrated circuits, specialized central processing unit (CPU), specialized memory, specialized components, etc. For example, the hardware can include personal computer, server, network device, etc. The program/software can be stored in a computer-readable storage medium including, e.g., ROM/RAM, magnetic disk, optical disk, etc.

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods and device can be used in a variety of Internet applications. Exemplary methods can be implemented by mobile terminals. By using the disclosed methods and device, for example, an Android virtual machine loading method and device can be provided to load a management object by a layer-booting object, and then load multiple instances of the virtual machine. The virtual machine can be running when switching between the instances. Therefore, an Android device can switch between instances without the need to reboot, or without the need to re-boot Bootloader to select the appropriate virtual machine to load. Therefore, the virtual machine can be running while performing a hot switch to switch instances, thus increased switching speed.

What is claimed is:

1. A method comprising:
    loading a layer-booting object that is a Linux Kernel layer object;
    loading a management object of a virtual machine by the loaded layer-booting object;
    reading a configuration of the virtual machine by the loaded management object of the virtual machine;
    invoking a creation function of the loaded management object of the virtual machine by the read configuration and thereby creating a zygote process; and
    creating an operational instance of the virtual machine based on Android Runtime layer by the zygote process.

2. The method according to claim 1, wherein
    the configuration further includes a processor status register instruction set corresponding to the operational instance of the virtual machine; and
    the method further comprising:
        coding the processor status register instruction set by invoking an instruction coding function of the loaded management object of the virtual machine.

3. The method according to claim 1, further comprising:
    accepting switching instructions of the virtual machine; and
    invoking a switching function of the loaded management object of the virtual machine by the accepted switching instructions of the virtual machine and thereby switching the operational instance of the virtual machine.

4. The method according to claim 1, further comprising:
    accepting creation instructions of the virtual machine; and
    invoking a creation function of the management object of the virtual machine by the accepted creation instructions of the virtual machine and thereby creating a new operational instance of the virtual machine.

5. The method according to claim 1, further comprising:
accepting switching instructions of the virtual machine; and
invoking a switching function of the loaded management object of the virtual machine by the accepted switching instructions of the virtual machine and thereby switching the operational instance of the virtual machine.

6. The method according to claim 1, further comprising:
accepting creation instructions of the virtual machine; and
invoking a creation function of the loaded management object of the virtual machine by the accepted creation instructions of the virtual machine and thereby creating the a new operational instance of the virtual machine.

7. A method comprising:
loading a layer-booting object that is a bootloader layer object;
loading a management object of a virtual machine by the loaded layer-booting object;
reading a configuration of the virtual machine by the loaded management object of the virtual machine;
invoking a creation function of the loaded management object of the virtual machine by the read configuration based on Linux Kernel layer and thereby creating an operational instance of the virtual machine;
intercepting interruption instructions and/or abnormal instructions by the loaded management object of the virtual machine;
accepting a memory location corresponding to the intercepted instructions and/or abnormal instructions; and
transmitting the intercepted instructions and/or abnormal instructions to a corresponding instructions handling function and/or an abnormal handling function of the operational instance of the virtual machine by the accepted memory location.

8. The method according to claim 7, further comprising:
accepting switching instructions of the virtual machine; and
invoking a switching function of the loaded management object of the virtual machine by the accepted switching instructions of the virtual machine and thereby switching the operational instance of the virtual machine.

9. The method according to claim 7, further comprising:
accepting creation instructions of the virtual machine; and
invoking a creation function of the loaded management object of the virtual machine by the accepted creation instructions of the virtual machine and thereby creating a new operational instance of the virtual machine.

10. A device comprising:
at least one computer configured to provide:
a boot-object loading module configured to load a layer-booting object that is a Linux Kernel layer object;
a management object loading module configured to load a management object of a virtual machine by the loaded layer-booting object;
a configuration reading module configured to read a configuration of the virtual machine by the loaded management object of the virtual machine; and
a virtual machine configuration initialization module configured to invoke a creation function of the loaded management object of the virtual machine by the read configuration and thereby create a zygote process, and to create an operational instance of the virtual machine based on Android Runtime layer by the zygote process.

11. The device according to claim 10, wherein the configuration further includes:
a processor status register instruction set corresponding to the operational instance of the virtual machine; and
the configuration reading module is further configured to code the processor status register instruction set by invoking an instruction coding function of the loaded management object of the virtual machine.

12. The device according to claim 10, wherein the at least one computer is further configured to provide a virtual machine switching module configured to accept a switching instructions of the virtual machine, and to invoke a switching function of the management object of the virtual machine by the accepted switching instructions of the virtual machine and thereby switch the operational instance of the virtual machine.

13. The device according to claim 10, wherein the at least one computer is further configured to provide a virtual machine creating module configured to accept a creation instructions of the virtual machine, and to invoke a creation function of the loaded management object of the virtual machine by the accepted creation instructions of the virtual machine and thereby create a new operational instance of the virtual machine.

14. A comprising:
at least one computer configured to provide:
a boot-object loading module configured to load a layer-booting object that is a bootloader layer object;
a management object loading module configured to load a management object of a virtual machine by the loaded layer-booting object;
a configuration reading module configured to read a configuration of the virtual machine by the loaded management object of the virtual machine; and
a virtual machine configuration initialization module configured to invoke a creation function of the loaded management object of the virtual machine by the read configuration based on Linux Kernel layer and thereby create an operational instance of the virtual machine,
wherein the at least one computer is further configured to provide an instructions scheduling module configured to intercept interruption instructions and/or abnormal instructions by the loaded management object of the virtual machine, to accept a memory location corresponding to the intercepted instructions and/or abnormal instructions, and to transmit the instructions and/or abnormal instructions to a corresponding instructions handling function and/or a abnormal handling function of the operational instance of the virtual machine by the memory location.

15. A non-transitory computer readable storage medium storing one or more programs, the one or more programs comprising instructions, which, when executed by a mobile device having one or more processors and a display, cause the mobile device to perform operations including:
loading a layer-booting object that is a Linux Kernel layer object;
loading a management object of a virtual machine by the loaded layer-booting object;
reading a configuration of the virtual machine by the loaded management object of the virtual machine;
invoking a creation function of the loaded management object of the virtual machine by the read configuration and thereby creating a zygote process; and
creating an operational instance of the virtual machine based on Android Runtime layer by the zygote process.

16. An apparatus comprising :
at least one computer configured to:
- load a layer-booting object that is a Linux Kernel layer object;
- load a management object of a virtual machine by the loaded layer-booting object;
- read a configuration of the virtual machine by the loaded management object;
- invoke a creation function of the loaded management object by the read configuration and thereby create a plurality of zygote processes;
- create a plurality of operational instances of the virtual machine based on Android Runtime layer by the plurality of zygote processes, respectively; and
- invoke a switching function of the loaded management object to thereby switch from a respective operational instance of the plurality of operational instances to a different operational instance of the plurality of operational instances.

* * * * *